United States Patent
Martineau et al.

(10) Patent No.: US 10,417,529 B2
(45) Date of Patent: Sep. 17, 2019

(54) LEARNING COMBINATIONS OF HOMOGENOUS FEATURE ARRANGEMENTS

(71) Applicant: Samsung Electronics Co., Ltd., Suwon-si, Gyeonggi-do (KR)

(72) Inventors: Justin Martineau, San Jose, CA (US); Jonathan J. Currey, Belmont, CA (US)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 217 days.

(21) Appl. No.: 15/266,925

(22) Filed: Sep. 15, 2016

(65) Prior Publication Data
US 2017/0076179 A1 Mar. 16, 2017

Related U.S. Application Data

(60) Provisional application No. 62/219,027, filed on Sep. 15, 2015.

(51) Int. Cl.
*G06K 9/62* (2006.01)
*G06N 3/08* (2006.01)
*G06K 9/66* (2006.01)
*G06N 3/04* (2006.01)

(52) U.S. Cl.
CPC ......... *G06K 9/6269* (2013.01); *G06K 9/6267* (2013.01); *G06K 9/66* (2013.01); *G06N 3/0454* (2013.01); *G06N 3/08* (2013.01)

(58) Field of Classification Search
CPC ...... G06K 9/6269; G06K 9/6267; G06K 9/66; G06T 5/20; G06N 3/08
See application file for complete search history.

(56) References Cited

U.S. PATENT DOCUMENTS

| | | | |
|---|---|---|---|
| 7,274,810 | B2 | 9/2007 | Reeves et al. |
| 7,756,305 | B2 | 7/2010 | Price |
| 7,805,386 | B2 | 9/2010 | Greer |
| 7,920,716 | B2 | 4/2011 | Sato et al. |
| 8,050,461 | B2 | 11/2011 | Shpunt et al. |
| 8,488,877 | B1 | 7/2013 | Owechko et al. |
| 8,577,129 | B2 | 11/2013 | Reeves et al. |
| 2002/0054694 | A1* | 5/2002 | Vachtsevanos ...... G01N 21/956 382/111 |
| 2003/0063775 | A1 | 4/2003 | Rafii et al. |
| 2008/0319317 | A1 | 12/2008 | Kamiyama et al. |
| 2009/0296985 | A1* | 12/2009 | Lv ........................ G06T 7/285 382/103 |
| 2010/0189313 | A1 | 7/2010 | Prokoski |
| 2010/0214936 | A1* | 8/2010 | Ito ........................ G06K 9/00986 370/252 |
| 2010/0316283 | A1 | 12/2010 | Greer |
| 2011/0116711 | A1* | 5/2011 | Wang ..................... G06K 9/4671 382/165 |

(Continued)

*Primary Examiner* — Nancy Bitar
(74) *Attorney, Agent, or Firm* — Sherman IP LLP; Kenneth L. Sherman; Steven Laut (57) ABSTRACT

One embodiment provides a method comprising receiving an input, and classifying the input utilizing a learned linear combination of multi-dimensional filters. Each multi-dimensional filter identifies a multi-dimensional pattern of a homogenous feature. The method further comprises generating an output indicative of a classification of the input.

20 Claims, 10 Drawing Sheets

(56) References Cited

U.S. PATENT DOCUMENTS

| | | | |
|---|---|---|---|
| 2011/0182469 A1* | 7/2011 | Ji | G06K 9/00335 |
| | | | 382/103 |
| 2012/0219200 A1 | 8/2012 | Reeves et al. | |
| 2012/0299945 A1* | 11/2012 | Aarabi | G06K 9/00281 |
| | | | 345/589 |
| 2014/0300758 A1* | 10/2014 | Tran | H04N 5/225 |
| | | | 348/207.1 |
| 2015/0055821 A1 | 2/2015 | Fotland | |
| 2015/0139536 A1* | 5/2015 | Jin | G06K 9/6267 |
| | | | 382/156 |
| 2015/0178631 A1 | 6/2015 | Thomas et al. | |
| 2015/0310660 A1 | 10/2015 | Mogilefsky et al. | |
| 2016/0019459 A1* | 1/2016 | Audhkhasi | G06K 9/6217 |
| | | | 706/22 |
| 2016/0350649 A1* | 12/2016 | Zhang | G06N 3/0454 |

\* cited by examiner

LEARNING COMBINATIONS OF HOMOGENOUS FEATURE ARRANGEMENTS

CROSS REFERENCE TO RELATED APPLICATIONS

This application claims priority from U.S. Provisional Patent Application Ser. No. 62/219,027, filed on Sep. 15, 2015, incorporated herein by reference.

TECHNICAL FIELD

One or more embodiments relate to object recognition, and in particular, a method and system for object recognition utilizing a learned linear combination of multi-dimensional filters.

BACKGROUND

Current state-of-the-art neural networks may be utilized to identify patterns in large quantities of data (e.g., images, video, audio, etc.). For example, deep learning neural networks may be used for image processing. Deep learning neural networks may also be used in different aspects of data science, such as machine translation, speech recognition, facial recognition, etc.

Convolutional neural networks (CNNs) are deep learning neural networks that provide translational independence via a convolutions of a filter over an input. Assume an input occupying a three-dimensional (3D) space with three dimensions: x-dimension, y-dimension, and z-dimension. Caffe is an example library for CNNs. In Caffe, traditional 3D convolution is implemented utilizing traditional 3D filters that span the depth of the input along the z-dimension but cover only a small section of the input along the x-dimension and the y-dimension. Each slice of the input along the z-dimension may represent a different homogenous feature with a unique semantic definition (i.e., meaning). The 3D filters are slidable across the input along the x-dimension and the y-dimension to identify patterns.

AlexNet is an example traditional CNN architecture. AlexNet provides grouped convolutions where multiple convolutional layers are stacked on top of each other. Input is sliced along the z-dimension into a number of equally sized groups. For example, the input may be sliced into two groups, and maximally tall filters on the two groups are independently learned using two independent pieces of computation hardware. The learned filters are shorter than the input and do not enforce homogeneity among the input.

SUMMARY

One embodiment provides a method comprising receiving an input, and classifying the input utilizing a learned linear combination of multi-dimensional filters. Each multi-dimensional filter identifies a multi-dimensional pattern of a homogenous feature. The method further comprises generating an output indicative of a classification of the input.

Another embodiment provides a system comprising at least one processor and a non-transitory processor-readable memory device storing instructions that when executed by the at least one processor causes the at least one processor to perform operations. The operations include receiving an input, and classifying the input utilizing a learned linear combination of multi-dimensional filters. Each multi-dimensional filter identifies a multi-dimensional pattern of a homogenous feature. The operations further comprises generating an output indicative of a classification of the input.

One embodiment provides a method comprising receiving a plurality of inputs, and training a first set of multi-dimensional filters based on the inputs. Each multi-dimensional filter of the first set identifies a first pattern type comprising a multi-dimensional pattern of a homogenous feature in the inputs. The method further comprises combining the first set of multi-dimensional filters using a second set of multi-dimensional filters. Each multi-dimensional filter of the second set has a higher number of dimensions than each multi-dimensional filter of the first set. The method further comprises learning a second pattern type comprising a learned linear combination of first pattern types identified by the combined first set of multi-dimensional filters. The second pattern type has a higher number of dimensions than each of the first pattern types identified by the combined first set of multi-dimensional filters.

These and other features, aspects and advantages of the one or more embodiments will become understood with reference to the following description, appended claims and accompanying figures.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

In this specification, the term "homogenous feature" generally refers to an input feature having only one semantic definition (i.e., meaning) in one input dimension.

Existing general purpose arrangements of homogenous features include, but are not limited to, lines, filled boxes, and circular blobs of features. Current state-of-the-art neural networks, however, are configured to only discover three-dimensional (3D) patterns. Further, complex and significantly larger neural networks may result in increased latency, increased network size, and increased computational costs.

One or more embodiments relate to object recognition, and in particular, a method and system for object recognition utilizing a learned linear combination of multi-dimensional filters. One embodiment provides a method comprising receiving an input, and classifying the input utilizing a learned linear combination of multi-dimensional filters. Each multi-dimensional filter identifies a multi-dimensional pattern of a homogenous feature. The method further comprises generating an output indicative of a classification of the input.

Another embodiment provides a system comprising at least one processor and a non-transitory processor-readable memory device storing instructions that when executed by the at least one processor causes the at least one processor to perform operations. The operations include receiving an input, and classifying the input utilizing a learned linear combination of multi-dimensional filters. Each multi-dimensional filter identifies a multi-dimensional pattern of a homogenous feature. The operations further comprises generating an output indicative of a classification of the input.

One embodiment provides a method comprising receiving a plurality of inputs, and training a first set of multi-dimensional filters based on the inputs. Each multi-dimensional filter of the first set identifies a first pattern type comprising a multi-dimensional pattern of a homogenous feature in the inputs. The method further comprises combining the first set of multi-dimensional filters using a second set of multi-dimensional filters. Each multi-dimensional filter of the second set has a higher number of dimensions than each multi-dimensional filter of the first set. The method further comprises learning a second pattern type comprising a learned linear combination of first pattern types identified by the combined first set of multi-dimensional filters. The second pattern type has a higher number of dimensions than each of the first pattern types identified by the combined first set of multi-dimensional filters.

One embodiment generates three-dimensional (3D) patterns based on a learned linear combination of two-dimensional (2D_ filters. Each 2D filter identifies a 2D pattern having only one semantic definition (i.e., meaning). Each 2D filter is individually slidable. The 2D filters identify shared 2D patterns (i.e., 2D patterns identified in a plurality of inputs), thereby reducing the need to learn more 2D patterns while increasing the usefulness of the shared 2D patterns. One embodiment generalizes and computes features with increased accuracy and speed.

Figure 1:
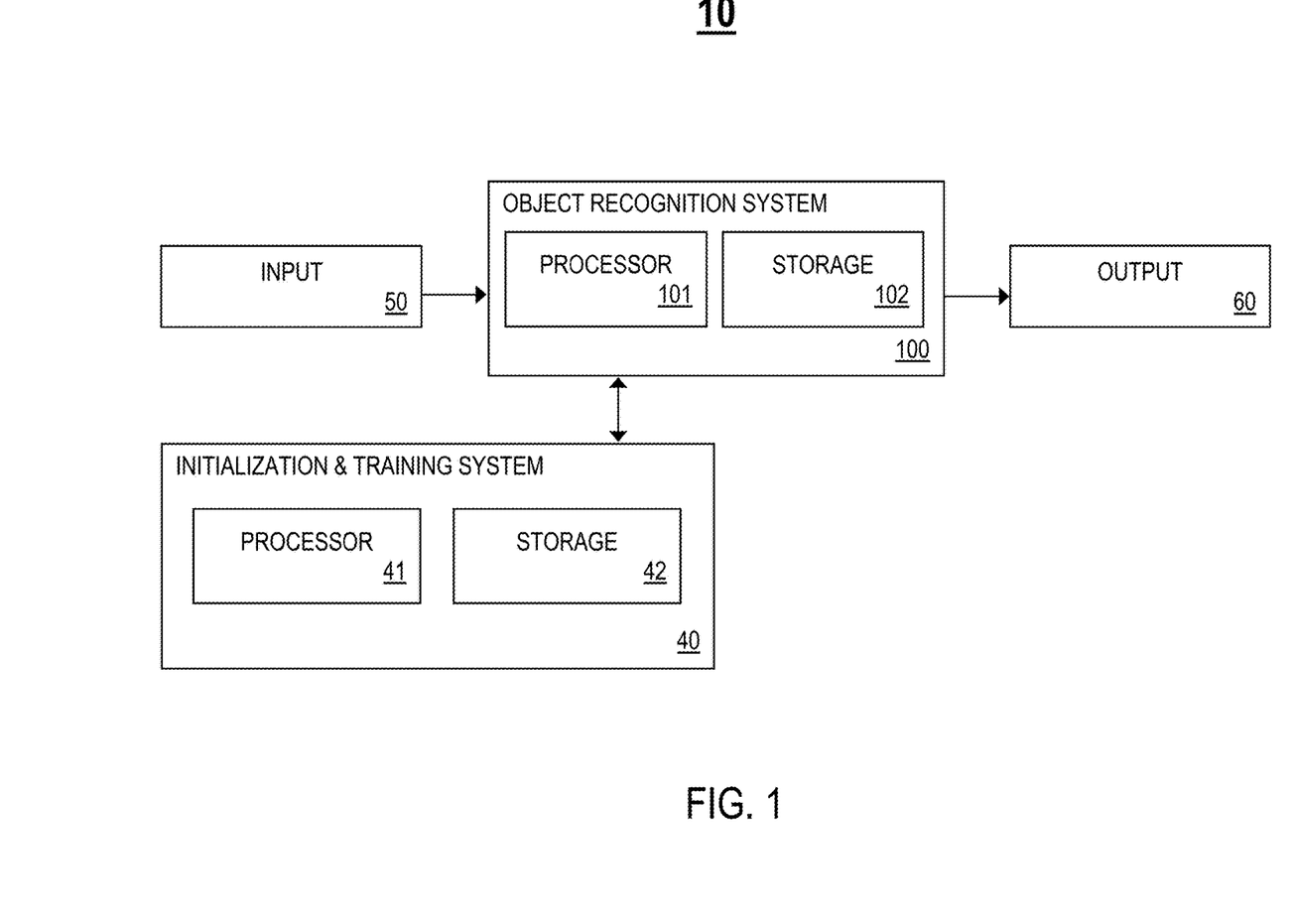
FIG. 1 illustrates an example computing architecture for implementing an object recognition system, in one or more embodiments.

FIG. 1 illustrates an example computing architecture 10 for implementing an object recognition system 100, in one or more embodiments. The computing architecture 10 comprises an initialization and training system 40 comprising computation hardware such as, but not limited to, one or more processor devices 41 and one or more storage devices 42. The computing architecture 10 further comprises an object recognition system 100 including computation hardware such as, but not limited to, one or more processor devices 101 and one or more storage devices 102. As described in detail later herein, one or more applications may execute/operate on the one or more processor devices 41 to create, initialize, and iteratively train the object recognition system 100. The object recognition system 100 comprises one or more convolutional neural networks (CNNs) 105 (FIG. 2B) for object recognition.

The object recognition system 100 is configured to receive an initial input volume 50 (e.g., an input image) and transform the initial input volume 50 into an output volume 60 (e.g., a classification of the input image).

In one embodiment, the computing architecture 10 is a centralized computing architecture. In another embodiment, the computing architecture 10 is a distributed computing architecture.

Figure 2A:
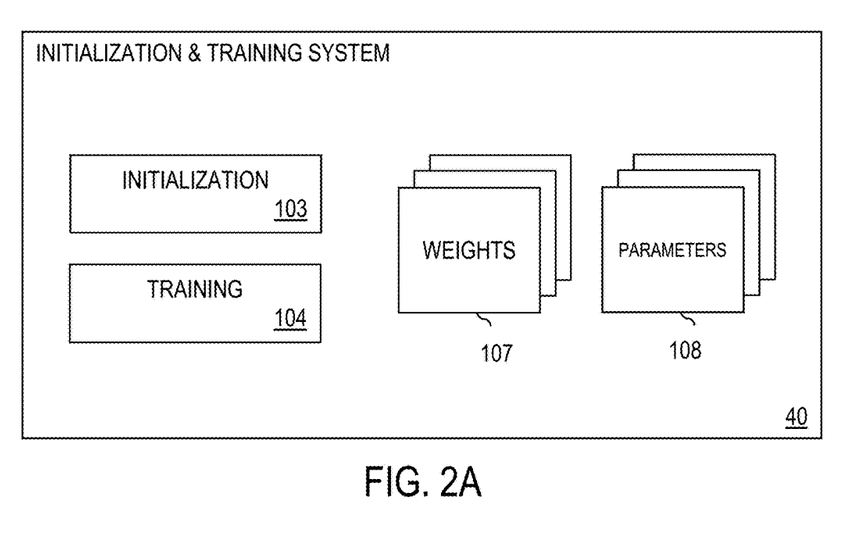
FIG. 2A illustrates the initialization and training system in detail, in one or more embodiments.

FIG. 2A illustrates the initialization and training system 40 in detail, in one or more embodiments. As stated above, one or more applications may execute/operate on the one or more processor devices 41 (FIG. 1) of the initialization and training system 40. In one embodiment, the applications include, but are not limited to, the following: (1) an initialization unit 103 configured to create and initialize a CNN 105 (FIG. 2B) of the object recognition system 100 utilizing the computation hardware of the object recognition system 100 (e.g., the one or more processor devices 101 and/or the one or more storage devices 102 shown in FIG. 1), and (2) a training unit 104 configured to iteratively train the CNN 105.

Figure 2B:
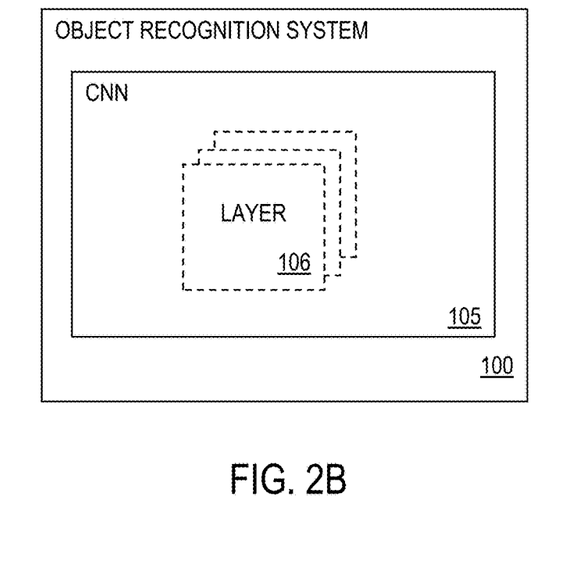
FIG. 2B illustrates the object recognition system in detail, in one or more embodiments.

FIG. 2B illustrates the object recognition system 100 in detail, in one or more embodiments. As stated above, the object recognition system 100 comprises one or more CNNs 105 for object recognition. Each CNN 105 comprises a set of weighted layers 106. Each layer 106 comprises a plurality of neurons 11 (FIG. 3) interconnected via a plurality of synaptic connections. Each layer 106 accepts an input and transforms the input to an output that is forwarded to a subsequent layer 106, if any.

Figure 3:
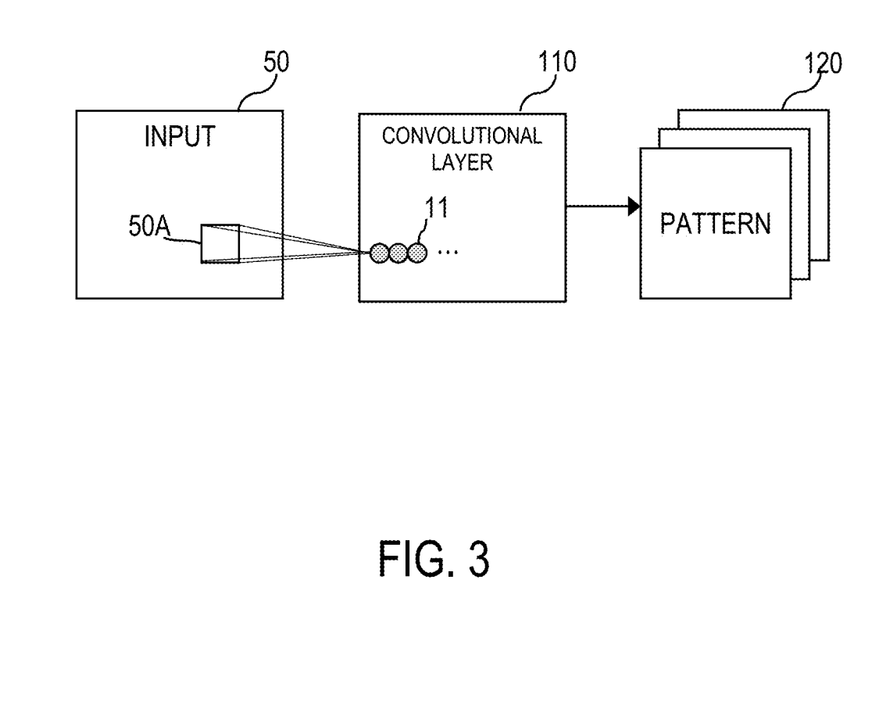
FIG. 3 illustrates an example convolutional layer, in one or more embodiments.

Returning to FIG. 2A, in one embodiment, the storage devices 42 of the initialization and training system 40 maintain one or more databases. The databases include, but are not limited to, the following: (1) a set of databases 107 maintaining, for each layer 106 of each CNN 105, a corresponding set of weights for use in creating, initializing, and training neurons 11 and synaptic connections of the layer 106, and (2) a set of databases 108 maintaining, for each layer 106 of each CNN 105, a corresponding set of parameters for use in creating, initializing, and training neurons 11 and synaptic connections of the layer 106.

The set of databases 108 further maintain, for each layer 106 of each CNN 105, one or more additional parameters such as, but not limited to, a corresponding window size and a corresponding stride interval. In one embodiment, the corresponding window size is indicative of a size of a window representing a region of an input the layer 106 processes (e.g., if the input is an image, the window may represent an image tile of the image, such as an image tile having dimensions 5×5 along the x and y dimensions). In one embodiment, the corresponding stride interval is indicative of a distance the window is slid along the x and y dimensions before the region of the input the window represents is computed.

FIG. 3 illustrates an example convolutional layer 110, in one or more embodiments. The set of weighted layers 106 comprises one or more convolutional layers 110. As described in detail later herein, the convolutional layers 110 output 3D patterns that are learned linear combinations of homogenous features.

The initial input volume 50 (FIG. 1) is presented to the convolutional layers 110 such that different semantic definitions occur along the z-dimension. Examples of semantic definitions include, but are not limited to, at least one of the following: (1) if the initial input volume 50 comprises a red, green, blue (RGB) image, a color related parameter (e.g., the color red, the color green, or the color blue), (2) if the initial input volume 50 comprises audio, an acoustic related parameter (e.g., tone, pitch, etc.), and (3) if the initial input volume 50 comprises a grayscale image, a black and white (B&W) related parameter.

At least one convolutional layer 110 receives inputs having the same semantic definition. In one embodiment, a first (i.e., initial) convolutional layer 110 of the CNN 105 receives, as input, the initial input volume 50 that comprises a local region 50A. Each neuron computes an output value for the local region 50A of the input volume 50. Each neuron accepts input for a homogenous feature having only one semantic definition.

For example, assume the initial input volume 50 comprises an image. The local region 50A comprises raw pixel values of an image tile of the image, wherein the raw pixel values have a homogenous feature (e.g., pixels spanning only one color channel).

In one embodiment, each subsequent conventional layer 110 receives, as input, one or more patterns 120 from an output channel of a prior convolutional layer 110.

As described in detail later herein, each convolutional layer 110 comprises a set of learnable filters (i.e., kernels, neurons).

Figure 4:
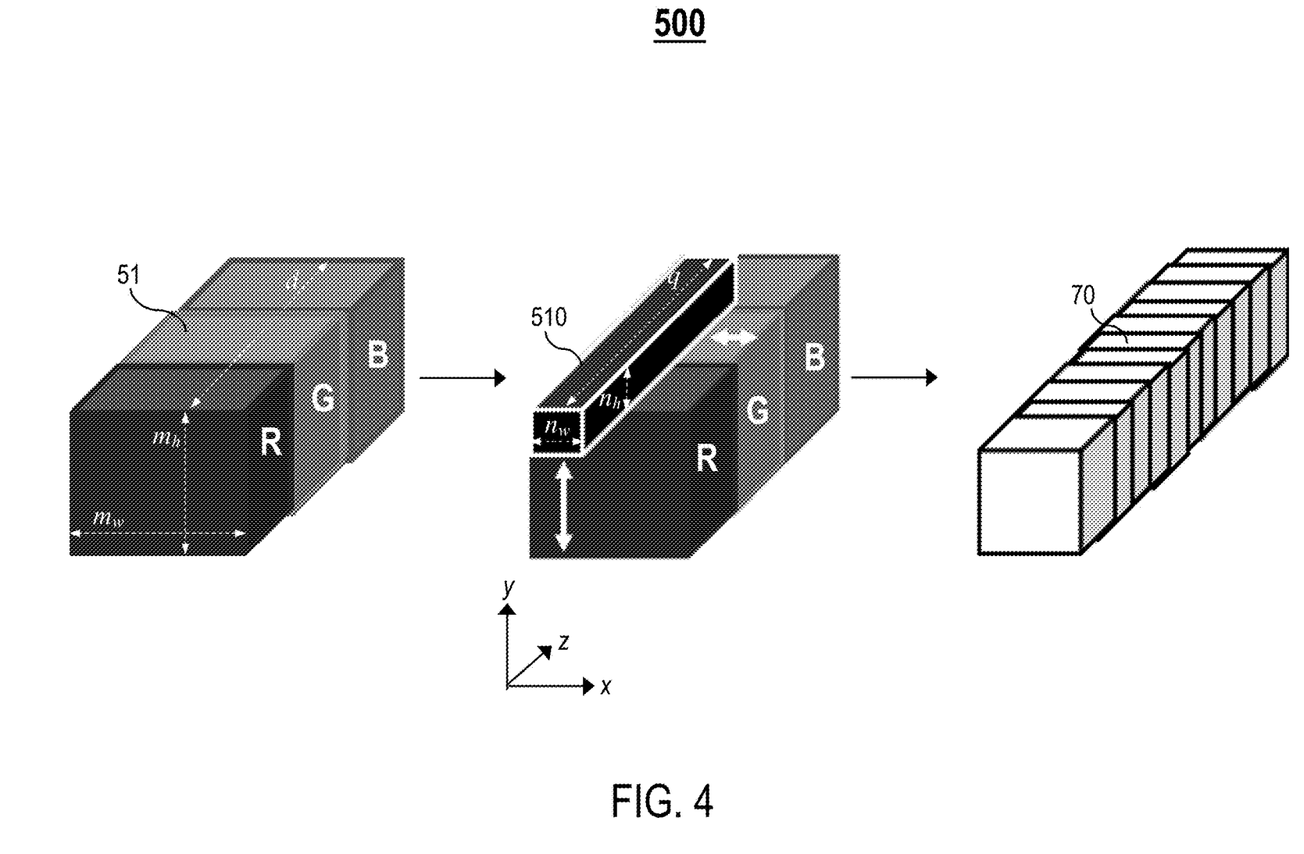
FIG. 4 illustrates an example architecture for a traditional convolutional neural network (CNN)

FIG. 4 illustrates an example architecture 500 for a traditional CNN. In a traditional CNN, each convolutional layer receives an input and implements traditional 3D convolution over the input.

For example, assume a convolutional layer receives an input 51 comprising an image m of dimensions $m_w \times m_h \times d$, wherein $m_w$ denotes a width of image m (e.g., size of image m along the x-dimension), $m_h$ denotes a height of image m (e.g., size of image m along the y-dimension), and d denotes a depth of image m (e.g., size of image m along the z-dimension). If image m is a grayscale image, d=1 as image m only has one color channel. If image m is a RGB image as shown in FIG. 4, d=3 as image m has three color channels (i.e., the red color channel, the green color channel, and the blue color channel).

The convolutional layer utilizes a maximally tall filter (i.e., size of the filter along the z-dimension is equal to size of the input 51 along the z-dimension) to identify a ridged pattern among all 2D arrangements of features of the input 51. For example, as shown in FIG. 4, each neuron of the convolutional layer utilizes a traditional 3D filter 510 of size $n_w \times n_h \times q$, wherein $n_w < m_w$, $n_h < m_h$, and $q \leq d$. The 3D filter 510 holds a numeric pattern. The 3D filter 510 identifies the numeric pattern in the input 51 by sliding across the input 51 along the x-dimension and the y-dimension.

The traditional CNN learns K 3D patterns of size x that span the depth of the input 51, wherein K and x are positive integers. For example, as shown in FIG. 4, a resulting output 70 of the convolutional layer comprises a 3D pattern that is exactly as big as the input 51 along the z-dimension (i.e., size of the 3D pattern along the z-dimension is equal to size of the input 51 along the z-dimension). As the input 51 comprises an RGB image, the 3D pattern spans all three color channels.

Figure 5:
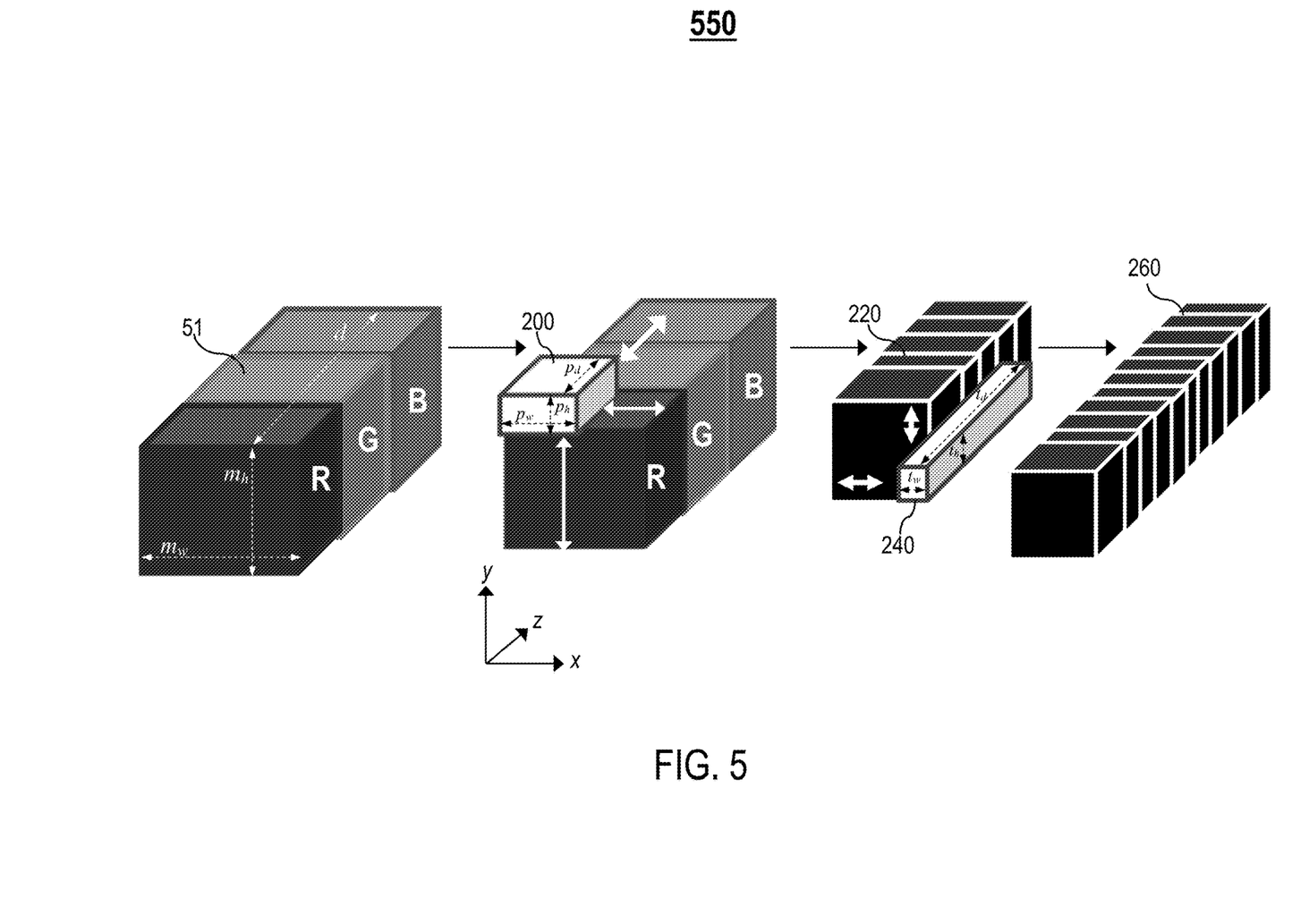
FIG. 5 illustrates an example architecture for a CNN, in one or more embodiments.

FIG. 5 illustrates an example architecture 550 for the CNN 105, in one or more embodiments. Unlike a traditional CNN that utilizes a maximally tall filter to identify a ridged pattern among all 2D arrangements of each feature, the CNN 105 utilizes the following two-step approach: (1) train a set of flat 2D filters (e.g., flat 2D filter 200 or flat 2D filter 300 in FIG. 6) for flat 2D convolutions over inputs of homogenous features, and (2) use tall thin 3D filters for tall thin 3D convolutions to create features with new semantic definitions based on combinations of the flat 2D filters. The two-step approach enforces learning arrangements of homogenous features in various parts of the CNN 105 to improve reusability of learned features, thereby increasing accuracy of object recognition and reducing network size (e.g., amount of memory on disk) and computational costs (e.g., latency and power consumption during run time). Even if only processing requirements for the two-step approach are limited to only a first convolutional layer 110 of the CNN 105, different factors such as network size, computational costs, and accuracy may be traded off against one another with an overall quality improvement for all the factors.

For example, assume an input 51 received by a first convolutional layer 110 of the CNN 105 comprises the RGB image m, as shown in FIG. 5. Image m has different semantic definitions along the z-dimension. Specifically, image m includes a first set of pixels spanning only the red color channel, a second set of pixels spanning only the green color channel, and a third set of pixels spanning only the blue color channel (i.e., three different semantic definitions).

Each neuron 11 of the first convolutional layer 110 utilizes a flat 2D filter 200 that implements a flat 2D convolution over a homogenous feature of the input 51. Unlike the traditional 3D filter 510 (FIG. 4) that is slidable along only the x-dimension and the y-dimension, the flat 2D filter 200 is individually slidable across the input 51 along the x-dimension, the y-dimension, and the z-dimension to identify a 2D pattern of the homogenous feature.

Further, unlike the traditional 3D filter 510 that may be maximally tall (i.e., a size of the filter 510 along the z-dimension is equal to the size of the input 51 along the z-dimension), the flat 2D filter 200 has a size $p_w \times p_h \times p_d$, wherein $p_w < m_w$, $p_h < m_h$, and $p_d = 1$. The flat 2D filter 200 examines only one semantic definition (i.e., only the color red, green, or blue).

In one embodiment, in a training phase, the training unit 104 trains a set of flat 2D filters by presenting a plurality of inputs (e.g., a plurality of images) and learning flat 2D filters that identify 2D patterns that may be combined/arranged to create features with new semantic definitions. The learned flat 2D filters facilitates sharing of 2D patterns in the CNN 105. Therefore, learning flat 2D filters enables learning of reusable 2D components (i.e., the shared 2D patterns) of 3D patterns. For example, if the inputs presented comprise a plurality of RGB images, the shared 2D patterns may include color-specific patterns such as a first set 200R (FIG. 7) of 2D patterns 201R (FIG. 7) that span only the red color channel, a second set 200G (FIG. 7) of 2D patterns 201G (FIG. 7) that span only the green color channel, and a third set 200B (FIG. 7) of 2D patterns 201B (FIG. 7) that span only the blue color channel.

Weights 220 in the first convolutional layer 110 comprises 2D patterns of a homogenous feature. After applying the weights 220 to the input 51, output is produced and fed to a subsequent convolutional layer 110 as input.

In one embodiment, the subsequent convolutional layer 110 utilizes a tall thin 3D filter 240 of size $t_w \times t_h \times t_d$, wherein $t_w = 1$, $t_h = 1$, and $t_d = d$. The tall thin 3D filter 240 implements a tall thin 3D convolution over the output to create a 3D pattern 260 with a new semantic definition based on learned linear combinations of flat 2D filters. The output may also be fed to one or more other layers of the CNN 105. For example, before the output is fed to the subsequent convolutional layer 110, the output may be fed to another layer of the CNN 105 to normalize the output or to implement a non-linear combination of 2D patterns.

In one embodiment, one or more subsequent convolutional layers 110 of the CNN 105 contain filters that detect more complex features (e.g., eyes, faces, etc.).

Figure 6:
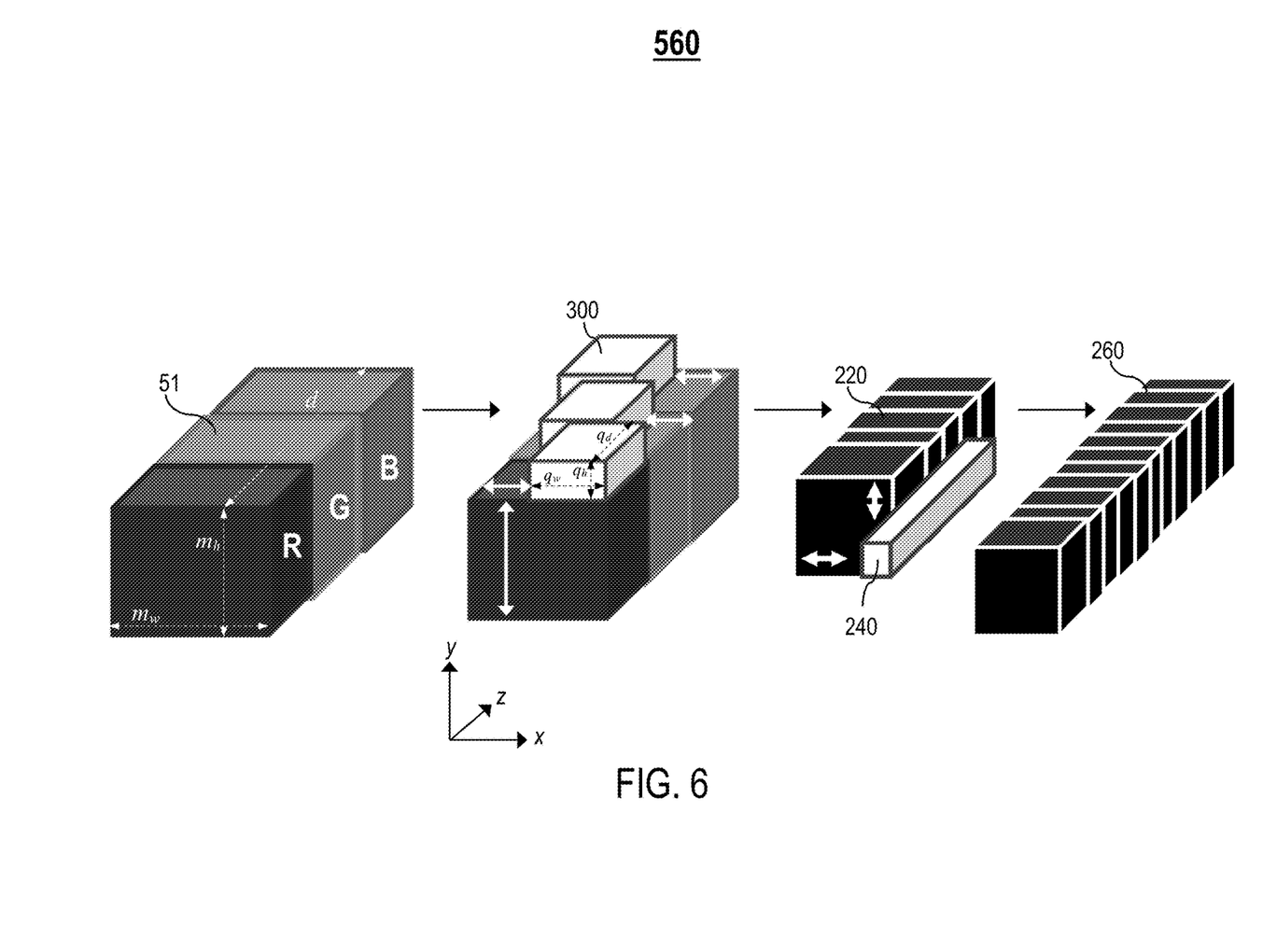
FIG. 6 illustrates another example architecture for a CNN, in one or more embodiments.

FIG. 6 illustrates another example architecture 560 for the CNN 105, in one or more embodiments. In one embodiment, each neuron 11 of the first convolutional layer 110 utilizes multiple flat 2D filters 300. Unlike the flat 2D filter 200 in FIG. 5 that is slidable along the z-dimension, each flat 2D filter operates at a specific z-dimension value and implements a flat 2D convolution over a homogenous feature that corresponds to the z-dimension value. Each flat 2D filter 300 examines only one semantic definition. Each flat 2D filter 300 has a size $q_w \times q_h \times q_d$, wherein $q_w < m_w$, $q_h < m_h$, and $q_d = 1$.

For example, as shown in FIG. 6, each neuron 11 utilizes a first convolutional filter 300 operating at a first z-dimension value corresponding to the red color channel, a second convolutional filter 300 operating at a second z-dimension value corresponding to the green color channel, and a third convolutional filter 300 operating at third z-dimension value corresponding to the blue color channel.

In another embodiment, each convolutional layer 110 of the CNN 105 corresponds to a particular semantic definition. The input 51 is split/partitioned into different input groups having different semantic definitions. Each input group corresponds to a particular semantic definition and comprises a portion of the initial 51 having the particular semantic definition (e.g., pixels spanning only one color channel). Each input group is forwarded to a convolutional layer 110 that corresponds to the same semantic definition as the input group; the convolutional layer 110 utilizes a flat 2D filter (e.g., flat 2D filter 200 in FIG. 5 or flat 2D filter 300 in FIG. 6) to identify 2D patterns of a homogenous feature in the input group. Outputs resulting from each convolutional layer 110 are joined, and various combinations of flat 2D filters are learned (e.g., utilizing a thin 3D filter of size 1×1×d).

In one embodiment, the CNN 105 includes a splitting layer for splitting/partitioning the input 51 into the different input groups. The semantic definitions share the same set of flat 2D filters learned over a convolutional layer 110. The flat 2D filters make no distinction between a pattern of red pixels and the same pattern in either green or blue pixels. Outputs of the flat 2D filters are added together for each color channel the filters were applied to. This is different from the other embodiments described above where patterns are learned with respect to color channel (i.e., the flat 2D filters distinguish between a pattern of red pixels and the same pattern in either green or blue pixels).

In yet another embodiment, a grouping parameter (i.e., group value) for the first convolutional layer 100 is set to equal the size of the input 51 along the z-dimension. This is unlike traditional 3D convolution where the grouping parameter is set based on available computation hardware. Various combinations of flat 2D filters are then learned (e.g., utilizing a thin 3D filter of size 1×1×d).

In one embodiment, the size of the CNN 105 may be made smaller by a process that involves hacking layers off of the CNN 105. This process includes slicing at least one layer along the z-dimension, removing similar slices (i.e., near duplicates) based on a similarity metric, and recombining output using an additional 1 by 1 convolutional layer where weights are determined using linear algebra.

Figure 7:
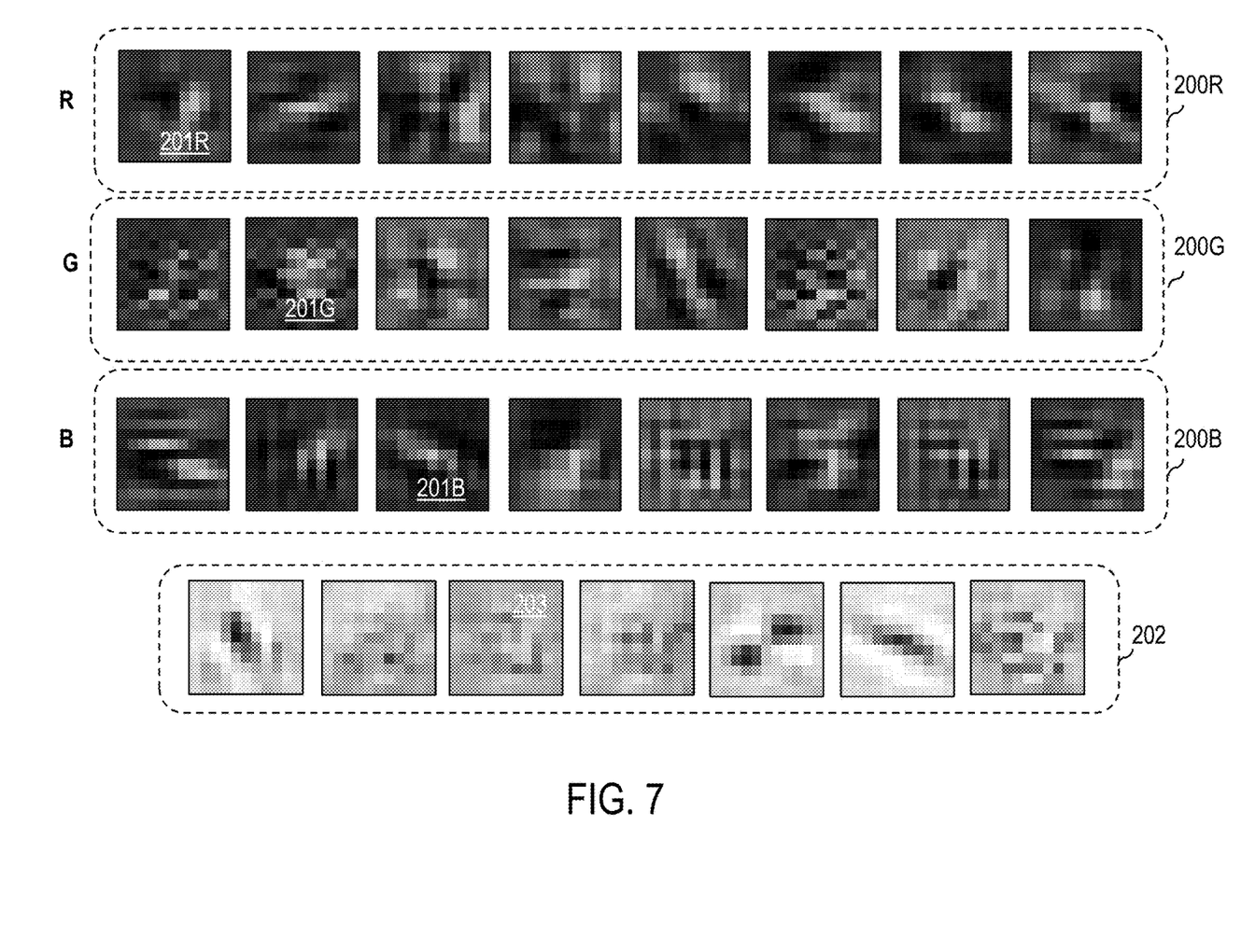
FIG. 7 illustrates example three-dimensional (3D) patterns created using learned linear combinations of two-dimensional (2D) filters, in one or more embodiments.

FIG. 7 illustrates example 3D patterns 203 created using learned linear combinations of flat 2D filters, in one or more embodiments. In one embodiment, the training unit 104 trains a small number of flat 2D filters (e.g., flat 2D filter 200 in FIG. 5 or flat 2D filter 300 in FIG. 6) to identify shared 2D patterns. For example, as shown in FIG. 7, the shared 2D patterns identified may include the following: (1) a first set 200R of 2D patterns 201R, wherein each pattern 201R spans only the red color channel, (2) a second set 200G of 2D patterns 201G, wherein each pattern 201G spans only the green color channel, and (3) a third set 200B of 2D patterns 201B, wherein each pattern 201B spans only the blue color channel.

If the flat 2D filters are trained to learn patterns with respect to color channel (i.e., the flat 2D filters distinguish between a pattern of red pixels and the same pattern in either green or blue pixels), the shared 2D patterns shown in FIG. 7 are color-specific patterns. If the flat 2D filters are trained to learn patterns irrespective of color channel (i.e., the flat 2D filters make no distinction between a pattern of red pixels and the same pattern in either green or blue pixels), the shared 2D patterns shown in FIG. 7 are color-generic patterns.

3D filters for identifying 3D patterns may be created using learned linear combinations of the flat 2D filters. For example, as shown in FIG. 7, a set 202 of 3D patterns 203 may be created using learned linear combinations of the flat 2D filters.

Figure 8:
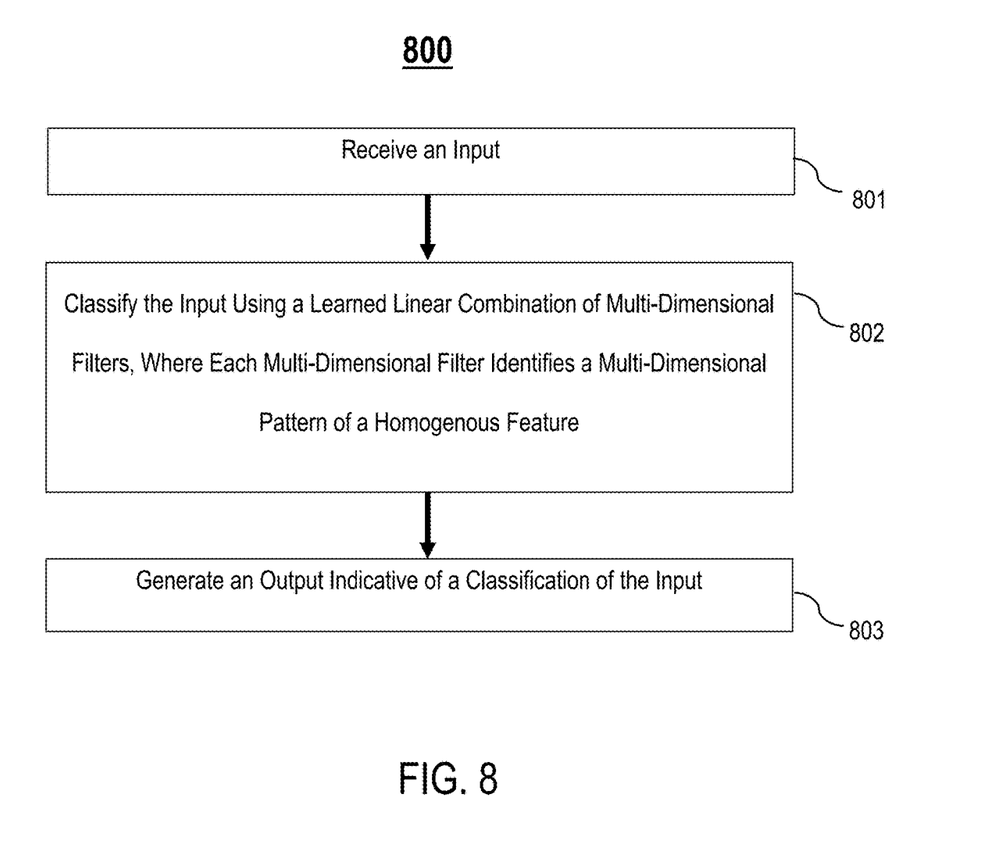
FIG. 8 is a flowchart of an example process for object recognition using a CNN, in one or more embodiments.

FIG. 8 is a flowchart of an example process 800 for object recognition using a CNN, in one or more embodiments. In process block 801, receive an input. In process block 802, classify the input using a learned linear combination of multi-dimensional filters, wherein each multi-dimensional filter identifies a multi-dimensional pattern of a homogenous feature. For example, each multi-dimensional filter may be a flat 2D filter that implements a flat 2D convolution over the input to identify a 2D pattern of a homogeneous feature. In process block 803, generate an output indicative of a classification of the input.

In one embodiment, process blocks 801-803 may be performed by the object recognition system 100.

Figure 9:
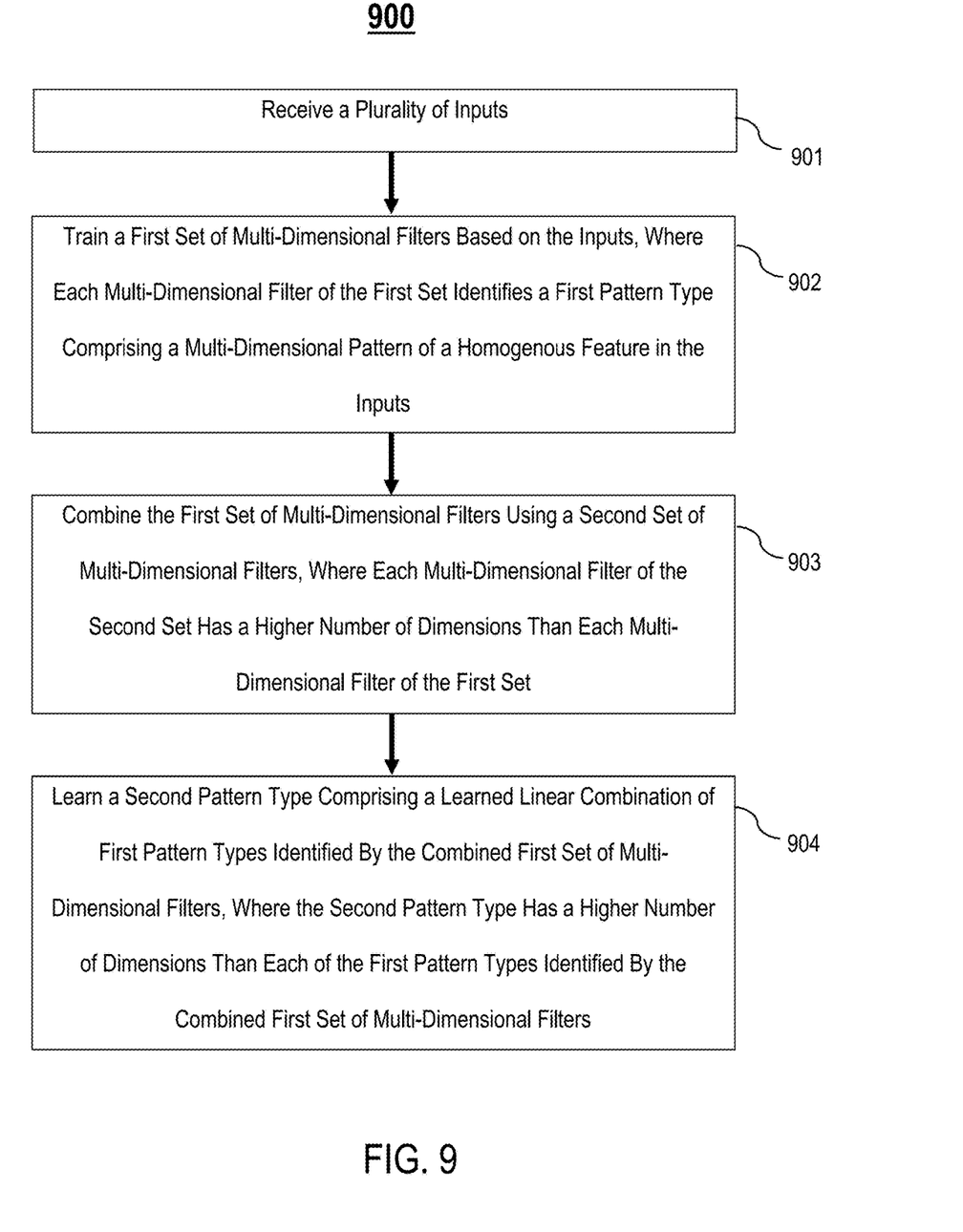
FIG. 9 is a flowchart of an example process for training a CNN for object recognition one layer at a time, in one or more embodiments.

In one embodiment, a CNN 105 of the object recognition system 100 may be trained for object recognition utilizing a training method that trains one layer of the CNN 105 at a time. For example, FIG. 9 is a flowchart of an example process 900 for training a CNN for object recognition one layer at a time, in one or more embodiments. In process block 901, receive a plurality of inputs. In process block 902, train a first set of multi-dimensional filters based on the inputs, wherein each multi-dimensional filter of the first set identifies a first pattern type comprising a multi-dimensional pattern of a homogenous feature in the inputs. For example, each multi-dimensional filter of the first set may be a flat 2D filter that implements a flat 2D convolution over an input to identify a 2D pattern of a homogeneous feature.

In process block 903, combine the first set of multi-dimensional filters using a second set of multi-dimensional filters, wherein each multi-dimensional filter of the second set has a higher number of dimensions than each multi-dimensional filter of the first set. For example, each multi-dimensional filter of the second set may be a 3D filter.

In process block 904, learn a second pattern type comprising a learned linear combination of first pattern types identified by the combined first set of multi-dimensional filters, wherein the second pattern type has a higher number of dimensions than each of the first pattern types identified by the combined first set of multi-dimensional filters. For example, the second pattern type may be a 3D pattern that is learned linear combination of 2D patterns identified by a combined set of flat 2D filters.

In one embodiment, process blocks 901-904 may be performed by at least one of the initialization unit 103, the training unit 104, and the object recognition system 100.

In another embodiment, a CNN 105 of the object recognition system 100 may be trained for object recognition utilizing a training method that trains all layers of the CNN 105 simultaneously. Examples of training methods that train all layers of a CNN simultaneously include, but are not limited to, backpropagation and stochastic gradient descent.

Figure 10:
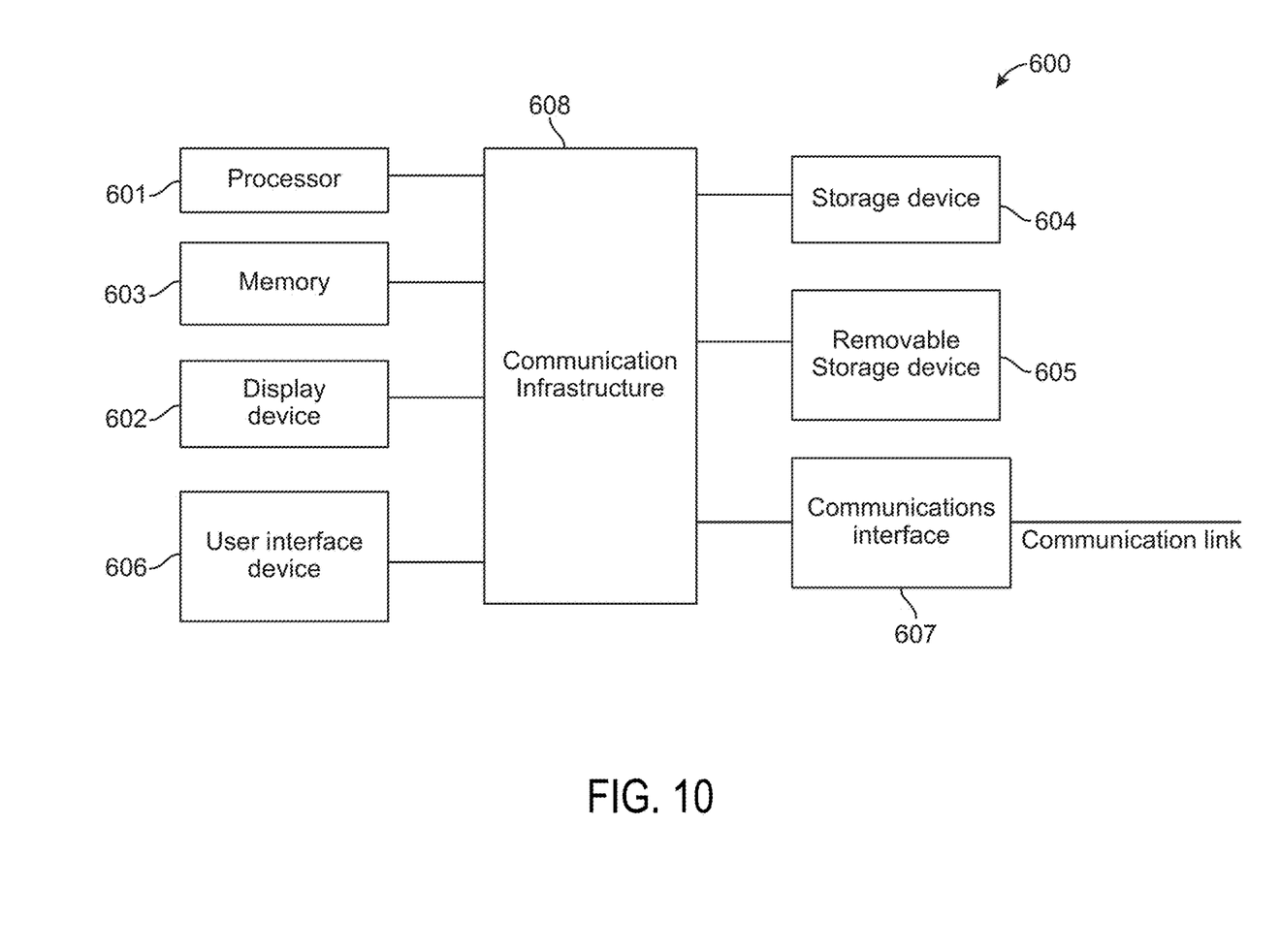
FIG. 10 is an exemplary high-level block diagram showing an information processing system comprising a computer system useful for implementing disclosed embodiments.

FIG. 10 is a high-level block diagram showing an information processing system comprising a computer system 600 useful for implementing the disclosed embodiments. Computer system 600 may be incorporated in an electronic device such as a mobile device or a server. The computer system 600 includes one or more processors 601, and can further include an electronic display device 602 (for displaying video, graphics, text, and other data), a main memory 603 (e.g., random access memory (RAM)), storage device 604 (e.g., hard disk drive), removable storage device 605 (e.g., removable storage drive, removable memory module, a magnetic tape drive, optical disk drive, computer readable medium having stored therein computer software and/or data), user interface device 606 (e.g., keyboard, touch screen, keypad, pointing device), and a communication interface 607 (e.g., modem, a network interface (such as an Ethernet card), a communications port, or a PCMCIA slot and card). The communication interface 607 allows software and data to be transferred between the computer system and external devices. The system 600 further includes a communications infrastructure 608 (e.g., a communications bus, cross-over bar, or network) to which the aforementioned devices/modules 601 through 607 are connected.

Information transferred via communications interface 607 may be in the form of signals such as electronic, electromagnetic, optical, or other signals capable of being received by communications interface 607, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process. In one embodiment, processing instructions for process 800 (FIG. 8) and processing instructions for process 900 (FIG. 9) may be stored as program instructions on the memory 603, storage device 604 and the removable storage device 605 for execution by the processor 601.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of one or more embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of one or more embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the invention.

Though the embodiments have been described with reference to certain versions thereof; however, other versions are possible. Therefore, the spirit and scope of the appended claims should not be limited to the description of the preferred versions contained herein.

What is claimed is:

1. A method comprising:
   receiving an input;
   filtering, using at least one convolutional neural network (CNN), the input utilizing a learned linear combination of multi-dimensional filters, wherein each multi-dimensional filter identifies a multi-dimensional pattern of a homogenous feature; and
   generating an output indicative of object recognition of the input.

2. The method of claim 1, wherein the input occupies a multi-dimensional space having a higher number of dimensions than each multi-dimensional filter.

3. The method of claim 2, wherein different semantic definitions occur along a dimension of the multi-dimensional space.

4. The method of claim 3, wherein each multi-dimensional filter has a size along a dimension of the multi-dimensional space that is less than a size of the input along the same dimension.

5. The method of claim 3, wherein each multi-dimensional filter is individually slidable across the input along each dimension of the multi-dimensional space.

6. The method of claim 4, wherein each multi-dimensional filter is individually slidable across the input along at least two dimensions of the multi-dimensional space, and the multi-dimensional filter operates at a particular value of one other dimension of the multi-dimensional space.

7. The method of claim 3, wherein each multi-dimensional filter examines the input for only one semantic definition.

8. The method of claim 3, wherein a semantic definition comprises one of a color related parameter, an audio related parameter, or a black and white related parameter.

9. The method of claim 1, wherein the input comprises at least one of an image, a video, or audio.

10. A system comprising:
    at least one processor; and a non-transitory processor-readable memory device storing instructions that when executed by the at least one processor causes the at least one processor to perform operations including:
    receiving an input;
    filtering, using at least one convolutional neural network (CNN), the input utilizing a learned linear combination of multi-dimensional filters, wherein each multi-dimensional filter identifies a multi-dimensional pattern of a homogenous feature; and
    generating an output indicative of object recognition of the input.

11. The system of claim 10, wherein the input occupies a multi-dimensional space having a higher number of dimensions than each multi-dimensional filter, and different semantic definitions occur along a dimension of the multi-dimensional space.

12. The system of claim 10, wherein each multi-dimensional filter has a size along a dimension of the multi-dimensional space that is less than a size of the input along the same dimension.

13. The system of claim 12, wherein each multi-dimensional filter is individually slidable across the input along each dimension of the multi-dimensional space.

14. The system of claim 12, wherein each multi-dimensional filter is individually slidable across the input along at least two dimensions of the multi-dimensional space, and the multi-dimensional filter operates at a particular value of one other dimension of the multi-dimensional space.

15. The system of claim 11, wherein each multi-dimensional filter examines the input for only one semantic definition.

16. A method comprising:
    receiving a plurality of inputs;
    training, using at least one convolutional neural network (CNN), a first set of multi-dimensional filters based on the plurality of inputs, wherein each multi-dimensional filter of the first set identifies a first pattern type comprising a multi-dimensional pattern of a homogenous feature in the plurality of inputs;
    combining the first set of multi-dimensional filters using a second set of multi-dimensional filters, wherein each multi-dimensional filter of the second set has a higher number of dimensions than each multi-dimensional filter of the first set;
    learning a second pattern type comprising a learned linear combination of first pattern types identified by the combined first set of multi-dimensional filters, wherein the second pattern type has a higher number of dimensions than each of the first pattern types identified by the combined first set of multi-dimensional filters; and
    generating one or more outputs indicative of object recognition for the plurality of inputs.

17. The method of claim 16, wherein each input of the plurality of inputs occupies a multi-dimensional space having a higher number of dimensions than each multi-dimensional filter of the first set, and different semantic definitions occur along a dimension of the multi-dimensional space.

18. The method of claim 16, wherein each multi-dimensional filter of the first set has a size along a dimension of the multi-dimensional space that is less than a size of each input along the same dimension, and the multi-dimensional filter examines the input for only one semantic definition.

19. The method of claim 17, wherein each multi-dimensional filter of the second set has a first size along at least two dimensions of the multi-dimensional space, the first size equal to one, each multi-dimensional filter has a second size along one other dimension of the multi-dimensional space, and the second size is equal to a size of each input of the plurality of inputs along the one other dimension.

20. The method of claim 16, wherein the plurality of inputs comprise a plurality of images.

* * * * *